(12) United States Patent
Leonard

(10) Patent No.: US 9,563,495 B1
(45) Date of Patent: Feb. 7, 2017

(54) DETECTING UPSET CONDITIONS IN CHANNEL INSTANCES

(71) Applicant: Sprint Communications Company L.P., Overland Park, KS (US)

(72) Inventor: Mark D. Leonard, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 165 days.

(21) Appl. No.: 14/458,742

(22) Filed: Aug. 13, 2014

(51) Int. Cl.
| | | |
|---|---|---|
| G06F 11/00 | (2006.01) | |
| G06F 11/07 | (2006.01) | |
| G06F 11/14 | (2006.01) | |
| G06F 11/30 | (2006.01) | |

(52) U.S. Cl.
CPC .......... *G06F 11/076* (2013.01); *G06F 11/079* (2013.01); *G06F 11/0793* (2013.01); *G06F 11/1464* (2013.01); *G06F 11/3006* (2013.01); *G06F 11/3072* (2013.01)

(58) Field of Classification Search
CPC .............. G06F 11/3006; G06F 11/3072; G06F 11/1464
See application file for complete search history.

(56) References Cited

U.S. PATENT DOCUMENTS

| | | | | |
|---|---|---|---|---|
| 7,246,181 | B2 * | 7/2007 | Rosing | ............... G06F 13/14 455/452.2 |
| 2008/0273555 | A1 * | 11/2008 | Chester | ............... H04L 1/003 370/500 |
| 2009/0222553 | A1 * | 9/2009 | Qian | ............... H04L 12/2602 709/224 |
| 2013/0121177 | A1 * | 5/2013 | Morton | ............... H04L 43/0823 370/252 |

* cited by examiner

*Primary Examiner* — Charles Ehne

(57) ABSTRACT

A method, system, and computer-readable media for automatically detecting an abnormal data transfer rate in a channel instance. The method includes determining a normal data transfer rate for a particular channel instance and then monitoring data transfer rates for a channel instance. Corrective action may be taken when the data transfer rate in a channel instances deviates more than a threshold amount from the normal rate.

18 Claims, 10 Drawing Sheets

DETECTING UPSET CONDITIONS IN CHANNEL INSTANCES

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present invention is defined by the claims below. Aspects of the present invention detect problems with one or more channel instances in a messaging middleware environment. Each channel instance carries data between a queue and components communicating with the queue. The components may be a computer application, another queue, or some other computing component. In one aspect, the queue and channel instances are part of a messaging-middleware environment. An aspect of the present invention monitors the performance of individual channel instances and detects an upset condition by comparing the present performance with a baseline performance or normal performance range. The channel instance's message transfer rate or byte transfer rate may be used to measure both present and normal performance.

BRIEF DESCRIPTION OF THE SEVERAL VIEWS OF THE DRAWINGS

Illustrative aspects of the present invention are described in detail below with reference to the attached drawing figures, which are incorporated by reference herein and wherein.

DETAILED DESCRIPTION

Figure 1:
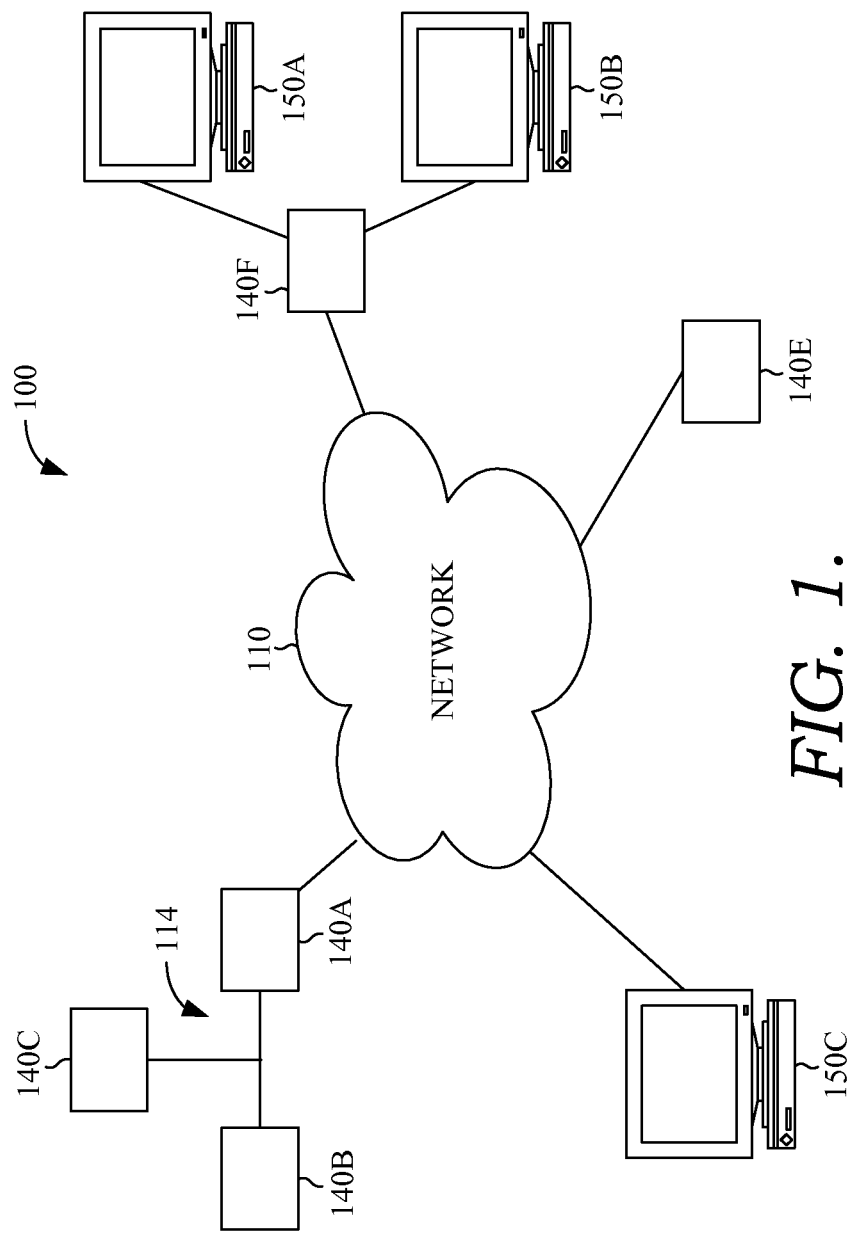
FIG. 1 is a drawing of an illustrative environment in which an aspect of the present invention may operate.

The present invention will be better understood from the detailed description provided below and from the accompanying drawings of various aspects of the invention, which describe, for example, generating an alarm based on the number of messages entering and leaving a queue during a period of time. The detailed description and drawings, however, should not be read to limit the invention to the specific aspects. Rather, these specifics are provided for explanatory purposes that help the invention to be better understood.

Aspects of the present invention may be embodied as, among other things, a method, system, or computer-program product. Accordingly, the aspects may take the form of a hardware aspect, a software aspect, or an aspect combining software and hardware. In one aspect, the present invention takes the form of a computer-program product that includes computer-useable instructions embodied on one or more computer-readable media.

Embodiments of the present invention detect problems in a channel instance. The channels are logical channels. They are used by queue managers and other entities within a messaging-middleware environment to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. The channels may be set up automatically by a message channel agent or other component when a queue manager has one or more messages to transmit. Once established, a channel may be active for a designated period of time before it is automatically deactivated. A messaging-middleware environment will be described in more detail with reference to FIG. 2.

Embodiments of the present invention monitor the performance of individual channel instances and detect an upset condition by comparing the present performance with a baseline performance or normal data transfer performance. The individual channel instance can be one of many instances of the channel. In one aspect, a load balancing component attempts to distribute messages equally among the active channel instances. The channel instance's message transfer rate may be used to measure performance. The transfer rate is the amount of data transferred over time. The transfer rate could also be measured by messages, bytes of data, or some other data unit.

In one embodiment, the performance of multiple channel instances for a channel is measured to determine a normal performance for an individual channel instance. In some embodiments, queues will have multiple channel instances communicating messages from the queue manager to a destination(s). Each channel instance has the same definition. Each instance may have its own identification information, but all instances perform the same function.

The normal rate may be determined by measuring the data throughput of the group of channel instances and dividing the throughput by the number of active channel instances during that time period. Thus, if one thousand messages were communicated through the group of 100 channel instances within a second, then the average transfer rate would be ten messages per second for an individual channel instance. A range of normal transfer rates may be established by analyzing the performance of the channel instances over different periods of time.

As mentioned, the present performance is compared against the normal performance and an upset response event triggered upon a difference between the two reaching a threshold. In one aspect, the threshold is a standard deviation from the normal performance. The performance may deviate above or below the normal performance.

Different groups of channel instances may have different normal performances. The groups may be organized in hierarchies. At the highest level, all instances of a channel may be a group. At a lower level, all instances of a channel instance that serve the same queue manager may be a group. Alternatively or additionally, channel instances that have the same process identification or thread identification can form a group. In this way, the normal data transfer performance may be established at different levels of granularity.

In one embodiment, an upset response event is an alarm that communicates the identification of the channel instance in which throughput rates outside of normal performance were detected.

In one embodiment, the upset response event is a reboot of the individual channel instance. The individual channel instance can be rebooted by rebooting the queue manager served by the channel instance. In deployments with multiple queue managers in parallel, the status of the other parallel queue managers may be evaluated prior to rebooting the queue manager to confirm adequate data transfer capacity is available to take one of the queue managers offline to reboot. Capacity may be evaluated by comparing the recent throughput, for example, for the last minute, last ten minutes, last hour, or similar, against the rated capacity of the active queue managers. Upon confirming adequate queue manager capacity across the group of queue managers, the queue manager can be rebooted. Upon determining inadequate total queue manager capacity across the group of queue managers, a timer may be started to recheck capacity after a period of time, for example, thirty minutes.

In another aspect, channel instances having problems are noted and are not rebooted until at least a threshold amount of channel instances associated with a single queue manager have performance problems. Once the threshold is reached or exceeded, the queue manager associated with the channel instances may be rebooted upon determining parallel queue managers have available capacity for the queue manger to been taken offline for rebooting.

As stated above, the present invention may be embodied as, among other things, a method, system, or computer-program product that is implemented as software, hardware, or a combination of the two, or as computer-readable media having computer-usable instructions embodied thereon. In these aspects, the exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Computer-readable media can be any available media that can be accessed by a computing device and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Aspects of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, and 140C, which communicate with each other via LAN 114, and servers 140E and 140F, which communicate with each other via network 110. Operating environment 100 is merely an example of one suitable networking environment and is not intended to suggest any limitation as to the scope of use or functionality of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that aspects are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, an internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement the present invention.

The operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of aspects in any form.

Figure 2:
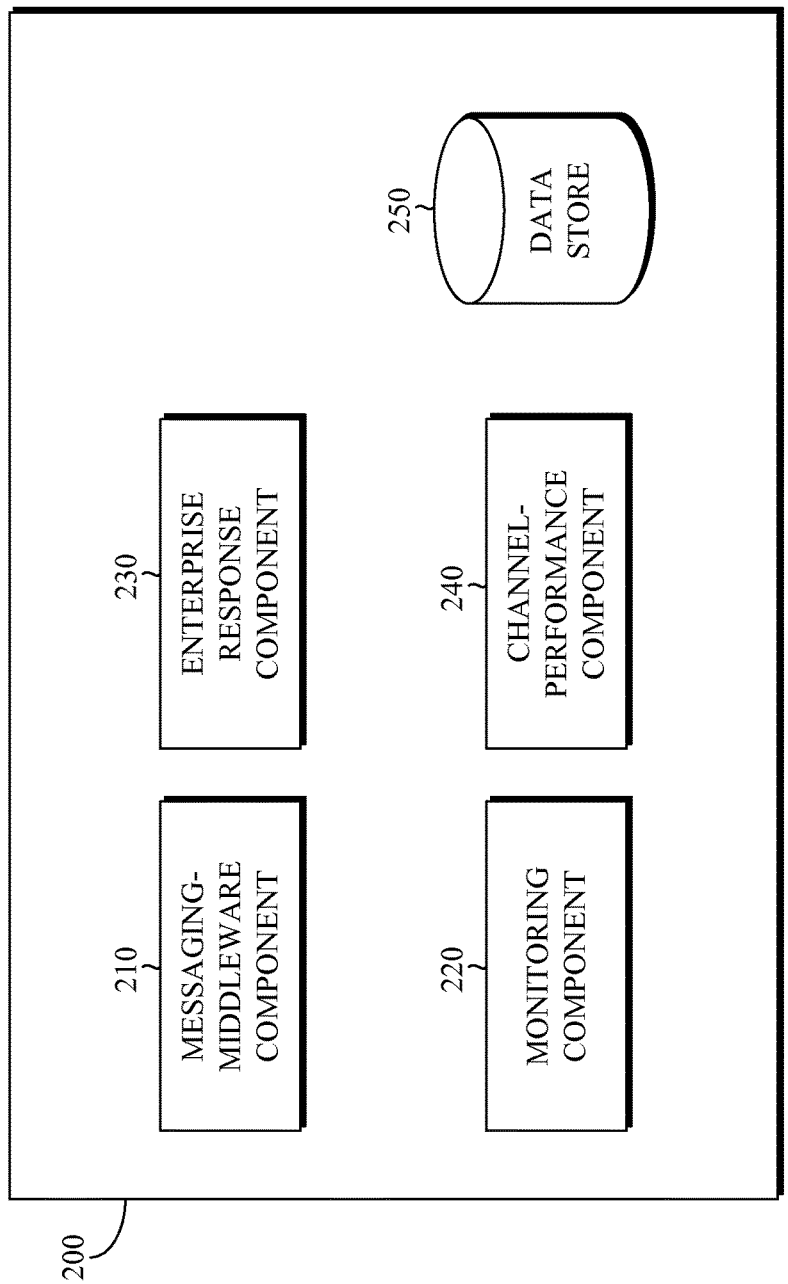
FIG. 2 is a drawing of an exemplary computing system architecture in which an aspect of the present invention may be practiced.

Turning now to FIG. 2, a block diagram depicts an exemplary computing system architecture 200 suitable for automatically detecting a problem with a channel instance. The exemplary computing system architecture 200 shown in FIG. 2 is merely an example and is not intended to suggest any limitation as to the scope of the use or functionality of the present invention. Neither should the exemplary computing system architecture 200 be interpreted as having any dependency or requirement related to any single component or combination of components illustrated therein.

Exemplary computing system architecture 200 includes messaging-middleware component 210, monitoring component 220, enterprise response component 230, channel-performance component 240, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging-middleware applications (a.k.a message-oriented middleware) include IBM's WebSphere® Mqueue (formerly Mqueue Series®), Fiorano's Mqueue, Oracle Advanced Queuing (AQ), and Microsoft's MSMqueue. The messaging-middleware component 210 can be any application that uses queues to transfer messages from one application to another. For example, information from application A is formed into one or more messages. These messages from application A are placed in a sending queue, within the messaging-middleware component 210, and transferred by the messaging-middleware component 210 into a receiving queue within the messaging-middleware component 210. Program B then retrieves the messages from the receiving queue. The messages are transmitted through channels within the messaging-middleware component. In this example, programs A and B could be located on any computing device communicatively coupled to the one or more computers on which the messaging-middleware component 210 resides. A messaging-middleware client may reside on the computing device on which programs A and B reside to allow interaction with the messaging-middleware component 210. The applications A and B may be independent from the messaging middleware.

The sending and receiving queues within the messaging-middleware component 210 are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is pre-set, but the current queue depth attribute changes based on the number of messages in the queue. Throughout this disclosure, preset attributes will be associated with settings, and attributes that are based on queue conditions are associated with attribute values. The primary attribute settings and values that are involved in aspects of the present invention include an incoming value, an outgoing value, and a reset-time-interval setting. Many other attributes may be used to describe a queue and may be accessed or modified in aspects of the present invention.

The above-mentioned attributes and settings are related to the amount of information or data entering and leaving a queue. The amount of information entering or leaving a queue may be measured in a variety of units of measure including the number of messages or bytes of data. Throughout this description, the amount of information will be described in terms of messages, but the invention is not intended to be limited to measuring the information entering and leaving a queue. A queue has a limited information capacity, which may be referred to as the maximum queue depth. The maximum allowable depth setting is the maximum amount of information the queue can hold before incoming messages are turned away. The current depth value is the current amount of information in the queue.

The incoming value is the amount of messages that have entered the queue since a reset period. Once the time period is reset, the incoming value is reset to zero and increases with each message that enters the queue. The outgoing value is the amount of messages that have exited the queue since the reset period. The reset time interval value is the time period after which the incoming value and the outgoing value are reset. In one aspect, the incoming value is called the enqueue rate and the outgoing value is called the dequeue rate.

Monitoring component 220 is configured to monitor messaging-middleware objects (e.g., channels, channel instances, and queues) to detect problems affecting the objects that may require corrective actions. A problem with a queue could indicate that a component associated with the queue is malfunctioning or the queue itself is malfunctioning. Examples of commercially available monitoring components include HP Openview®, queue Pasa!® by MQSoftware, Candle's PathWAI, and BMC Patrol. The monitoring component 220 may retrieve, store, and evaluate queue values periodically to ascertain whether a problem is present. For example, the current depth of the queue could be retrieved periodically. Having retrieved an attribute value, the attribute value is then evaluated against threshold values within the monitoring component 220, such as a high-depth threshold setting for a particular queue. The monitoring component 220 would then generate an alarm if the current queue depth exceeds the high-depth threshold value.

The monitoring component 220 is also configured to generate and transmit notifications describing problems associated with a queue. In one aspect, the notification is transmitted to enterprise response component 230. In another aspect, the monitoring component 220 directly notifies a designated responder about the alarm condition.

Enterprise response component 230 is configured to coordinate a response to malfunctions associated with a queue. The enterprise response component 230 may receive information regarding problems from the monitoring component 220 or another source. Upon receiving a notification, the enterprise response component 230 may page a designated responder to investigate the alarm condition. A designated responder may be an individual person or group of people given responsibility to fix malfunctions associated with assigned queues. In another aspect, the designated responder may be a computer application that takes corrective actions.

The data store 250 is configured for storing information related to a queue. Information such as the incoming value, the outgoing value, the current depth, and other queue attributes including queue identification information may be stored. Similarly, the performance of individual channel instances or groups of channel instances may be stored. Alarms and determinations of upset conditions, along with records of any remedial actions taken in response, may be stored.

The channel-performance component 240 is configured for calculating a normal performance for a channel instance. The channel-performance component 240 may also monitor the present performance of a channel instance and determine if an upset condition exists. The channel-performance component 240 may work with monitoring component 220 and other components to gather data.

The channel-performance component 240 of the present invention detects problems in a channel instance. The problems may be described herein as an upset condition. The channel instances are responsible for communicating messages accumulating within a queue to a destination. The destination may be a computer application, another queue, or some other computing component. In one aspect, the queue and channel instances are part of a messaging-middleware environment.

Embodiments of the present invention monitor the performance of individual channel instances and detect an upset condition by comparing the present performance with a baseline performance or normal data transfer performance. The individual channel instance can be one of many instances of the channel. In one aspect, a load balancing component attempts to distribute messages equally among the active channel instances. The channel instance's message transfer rate may be used to measure performance. The transfer rate is the amount of data transferred over time. The transfer rate could also be measured by messages, bytes of data, or some other data unit.

In one embodiment, the performance of multiple channel instances for a channel is measured to determine a normal performance for an individual channel instance. In some embodiments, queues will have multiple channel instances communicating messages from the queue manager to a destination(s). Each channel instance has the same definition. Each instance may have its own identification information, but all instances perform the same function.

The normal rate may be determined by measuring the data throughput of the group of channel instances and dividing the throughput by the number of active channel instances during that time period. Thus, if one thousand messages were communicated through the group of one hundred channel instances within a second, then the average transfer rate would be ten messages per second for an individual channel instance. A range of normal transfer rates may be established by analyzing the performance of the channel instances over different periods of time.

As mentioned, the present performance is compared against the normal performance and an upset response event triggered upon a difference between the two reaching a threshold. In one aspect, the threshold is a standard deviation from the normal performance. The performance may deviate above or below the normal performance.

Different groups of channel instances may have different normal performances. The groups may be organized in hierarchies. At the highest level, all instances of a channel may be a group. At a lower level, all instances of a channel instance that serve the same queue manager may be a group. Alternatively or additionally, channel instances that have the same process identification or thread identification can form a group. In this way, the normal data transfer performance may be established at different levels of granularity.

In one embodiment, an upset response event is an alarm that communicates the identification of the channel instance in which outside of normal throughput rates outside of normal performance were detected.

In one embodiment, the upset response event is a reboot of the individual channel instance. The individual channel instance can be rebooted by rebooting the queue manager served by the channel instance. In deployments with multiple queue managers in parallel, the status of the other parallel queue managers may be evaluated prior to rebooting the queue manager to confirm adequate data transfer capacity is available to take one of the queue managers offline to reboot. Capacity may be evaluated by comparing the recent throughput, for example, for the last minute, last ten minutes, last hour, or similar, against the rated capacity of the active queue managers. Upon confirming adequate queue manager capacity across the group of queue managers, the queue manager can be rebooted. Upon determining inadequate total queue manager capacity across the group of queue managers, a timer may be started to recheck capacity after a period of time, for example, thirty minutes.

In another aspect, channel instances having problems are noted and are not rebooted until at least a threshold amount of channel instances associated with a single queue manager have performance problems. Once the threshold is reached or exceeded, the queue manager associated with the channel instances may be rebooted upon determining parallel queue managers have available capacity for the queue manger to been taken offline for rebooting.

Figure 8:
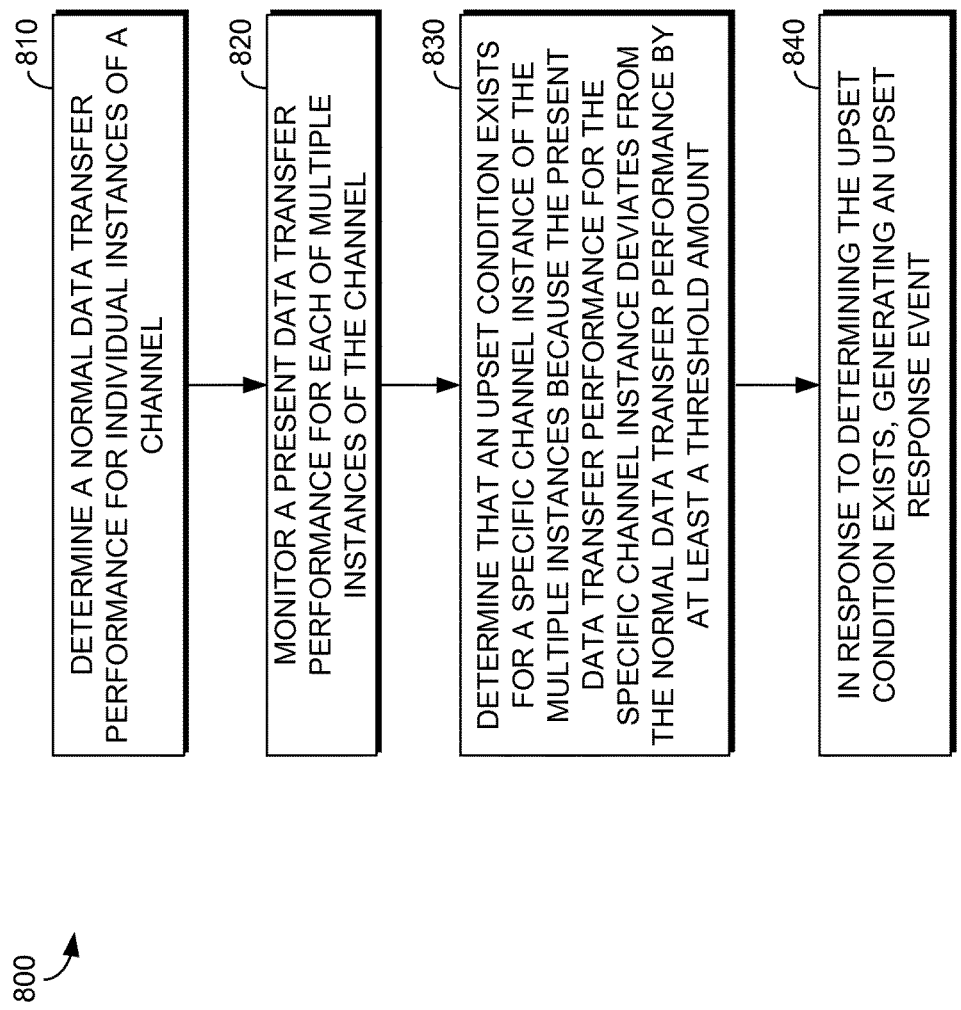
FIG. 8 is a flow diagram in which a method of detecting an abnormal data transfer rate in a channel instance is described according to an aspect of the present invention.
Figure 9:
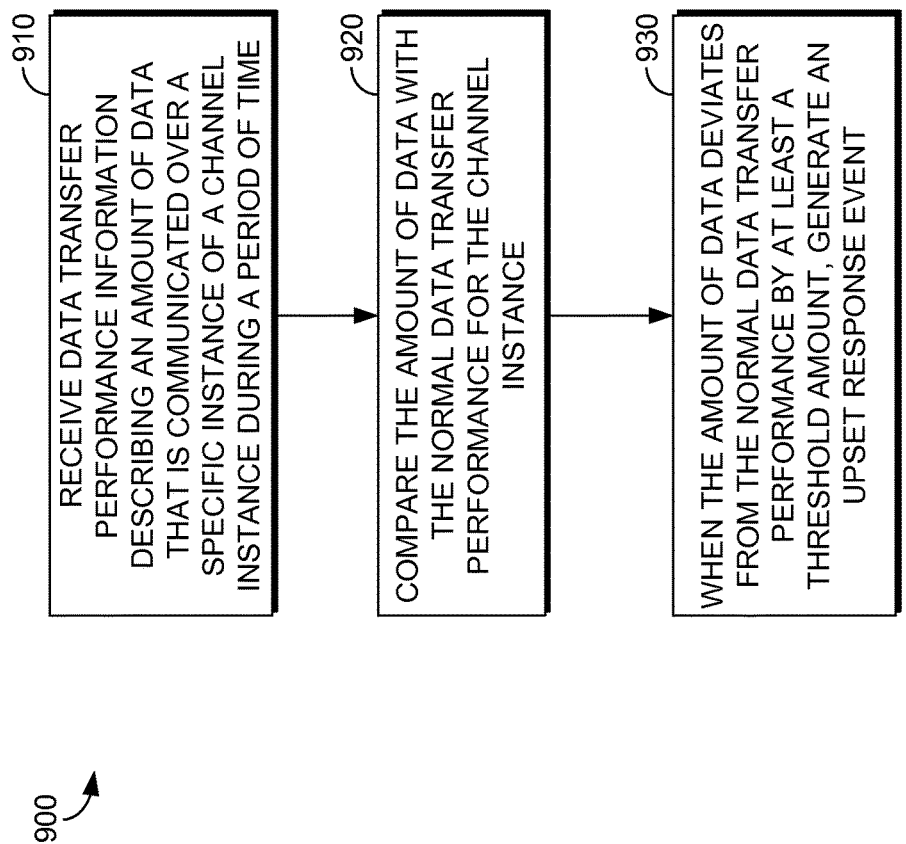
FIG. 9 is a flow diagram in which a method of detecting an abnormal data transfer rate in a channel instance is described according to an aspect of the present invention.
Figure 10:
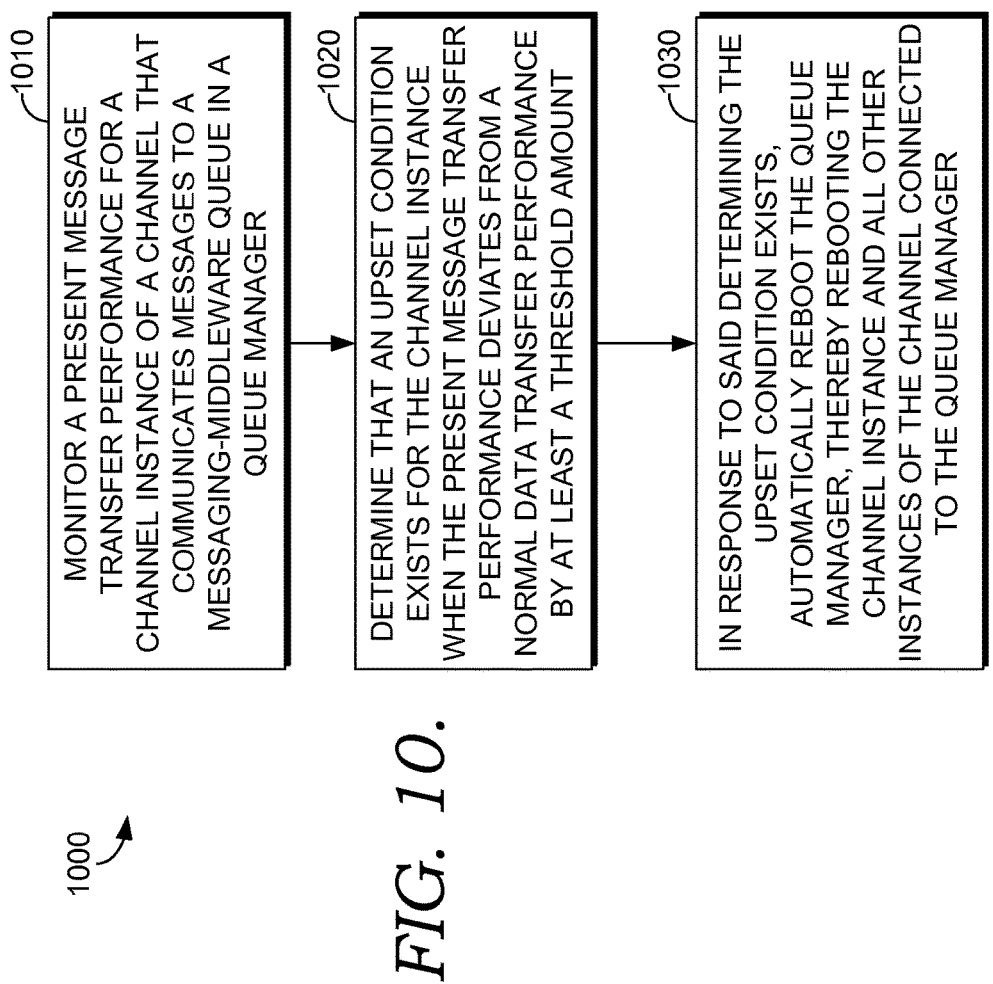
FIG. 10 is a flow diagram in which a method of detecting an abnormal data transfer rate in a channel instance is descripted according to an aspect of the present invention.

Using the methods explained in FIGS. 8-10, the channel-performance component 240 analyzes channel usage to detect problems. Before explaining those methods, the allocation of channels and what is meant by particular instances of a named channel are illustrated in more detail with reference to FIGS. 3 and 4.

Figure 3:
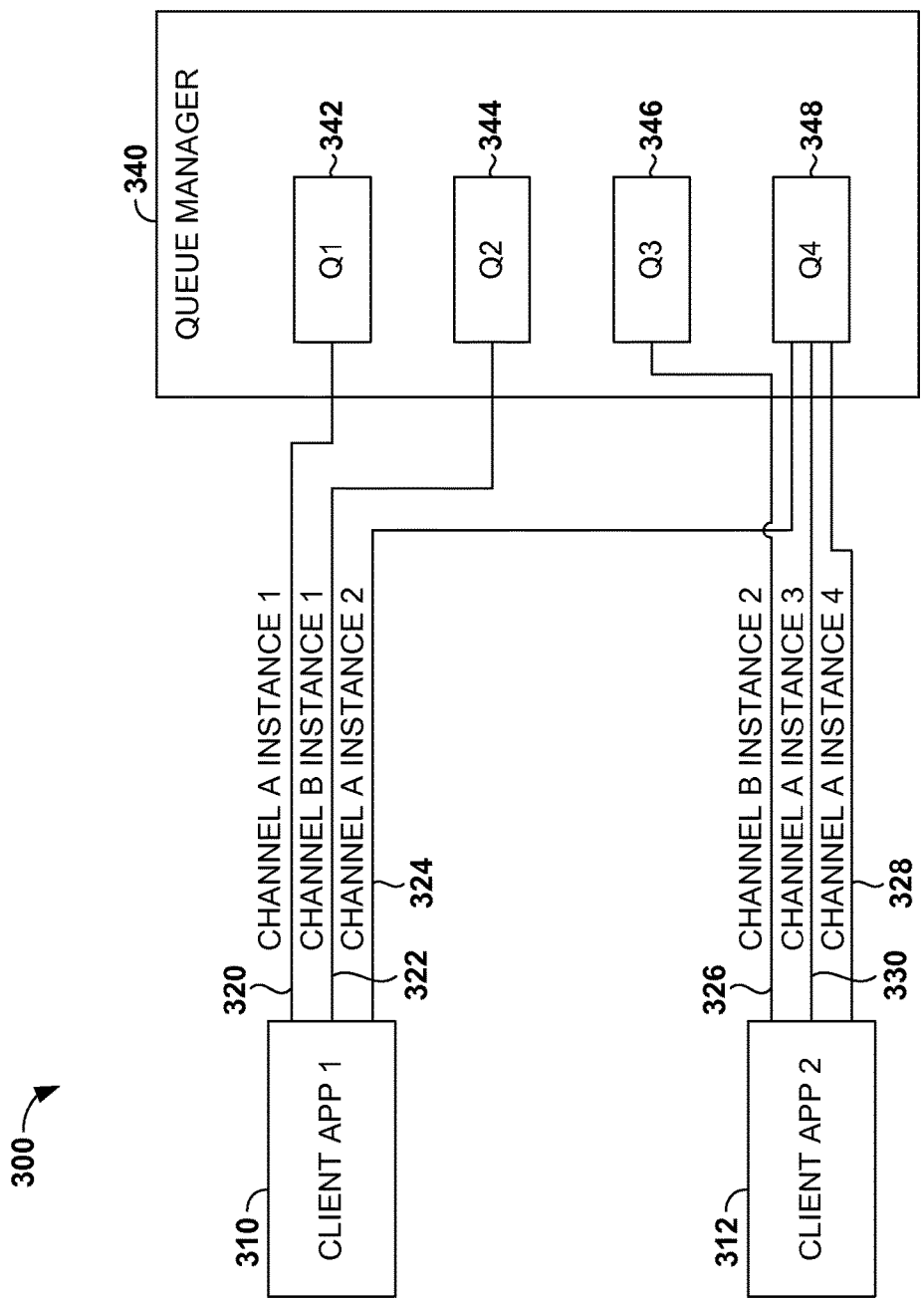
FIG. 3 is a drawing showing the normal performance of a channel instance, in accordance with an aspect of the present invention.

Turning now to FIG. 3, a diagram illustrating exemplary channel instances in a messaging-middleware environment 300 is shown, in accordance with an embodiment of the present invention. As mentioned previously, embodiments of the present invention allow a user to manage individual instances of channels. The channels are logical channels. They are used by queue managers and other entities within the messaging-middleware environment 300 to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. The channels may be set up automatically by a message channel agent or other component when a queue manager has one or more messages to transmit to a second queue manager. Once established, a channel may be active for a designated period of time before it is automatically deactivated.

Messaging-middleware environment 300 includes client application 1 310, client application 2 312, and queue manager 340. Messages are communicated between the client applications and the queue manager 340 through channel instances. The individual queue manager 340 includes queue 1 342, queue 2 344, queue 3 346, and queue 4 348. In an actual embodiment, an individual queue manager may manage hundreds or thousands of individual queues. Four queues are shown for the sake of simplicity.

Messaging-middleware environment 300 includes four instances of channel A. As described previously, each instance of channel A shares a common definition. The channel definition defines attributes of each channel instance that govern how messages are communicated in the channel. A developer, or other person responsible for the messaging-middleware environment 300, may use a library of channel definitions. Different channel definitions are used to initiate channel instances suitable for communicating certain types of messages under certain conditions. While individual channel instances have many characteristics in common, each channel instance may be differentiated by its process ID and a thread ID.

Figure 4:
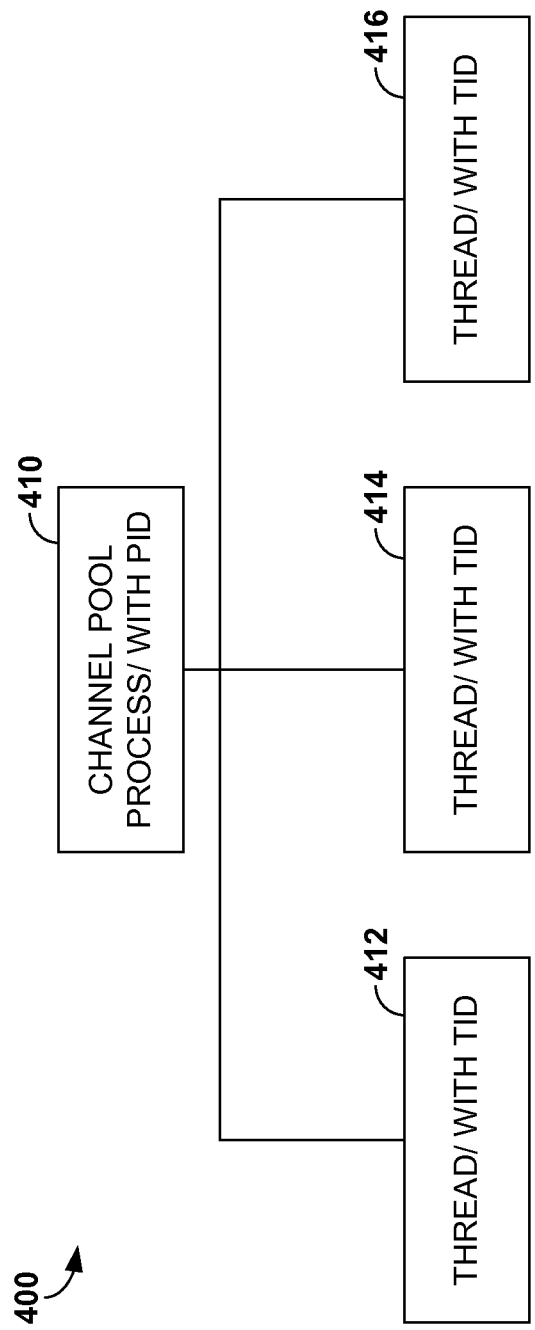
FIG. 4 is a drawing showing the abnormal performance of a channel instance, in accordance with an aspect of the present invention.

Turning briefly to FIG. 4, the relationship between a process ID and thread ID is shown. Initially, a group of channels may be pooled together by a queue manager and assigned the same process ID. A channel pool 410 may have several individual threads. The threads have a one-to-one relationship with channel instances. Each channel instance has its own thread. In FIG. 4, the channel pool 410 includes thread 412, thread 414, and thread 416. Each thread has its own thread ID. An individual channel instance can be uniquely identified by combining the channel process ID and the thread ID.

Returning now to FIG. 3, messaging-middleware environment 300 includes four instances of channel A and two instances of channel B. For the sake of illustration, all six channel instances shown may have the same process ID. Alternatively, each channel instance shown may have a different process ID depending on how the channel instances were pooled together. In one embodiment, channel instances are pooled sequentially in chronological order as they are initiated.

Channel A instance 1 320 is used to communicate messages between client app 1 310 and queue 1 342. Channel B instance 1 322 communicates messages between client app 1 310 and queue 2 344. Channel A instance 2 324 communicates messages between client app 1 310 and queue 4 348. This illustrates that instances of the same channel can communicate messages between different endpoints. For example, instance 320 and instance 324, both instances of channel A, communicate messages between different endpoints.

Channel B instance 2 326 communicates messages between client app 2 312 and queue 3 346. Channel A instance 3 330 communicates messages between client app 2 312 and queue 4 348. Channel A instance 4 328 communicates messages between client app 2 312 and queue 4 348. This illustrates that different instances of a channel can communicate between the same endpoints, as shown by instances 328 and 330. Though not shown, different channels can also communicate messages between the same two endpoints. Embodiments of the present invention are not limited by the example channel instances shown in FIG. 3.

Figure 5:
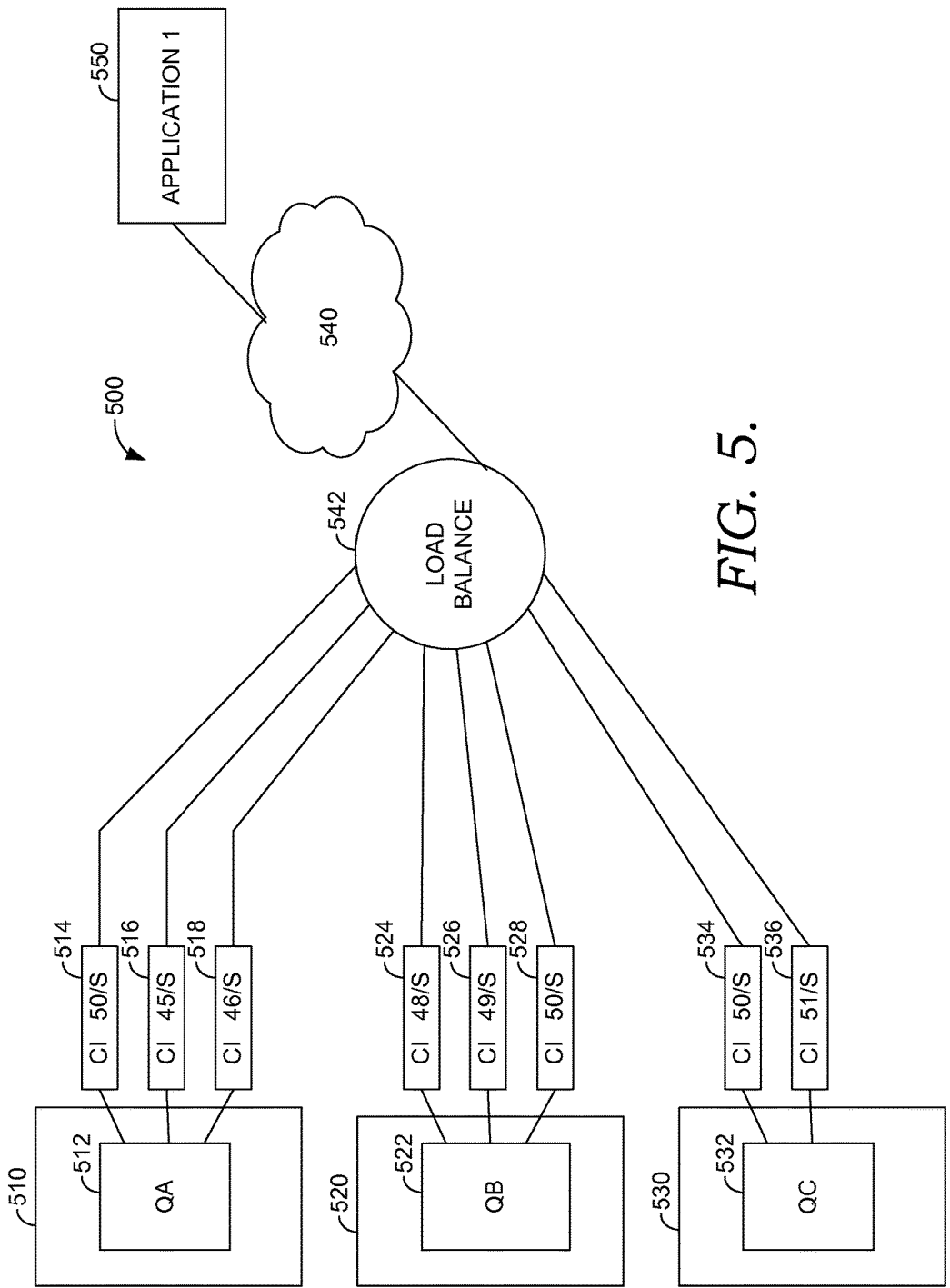
FIG. 5 is a drawing showing the reboot of a queue manager and associated channel instances, in accordance with an aspect of the present invention.

Turning now to FIG. 5, a messaging-middleware environment 500 illustrating normal performance of channel instances is shown, in accordance with an aspect of the present invention. The messaging-middleware environment 500 comprises machine 510, machine 520, and machine 530 all connected to application 1 550 through network 540. The machines may be real machines, such as a server, or virtual machines. Machine 510 hosts queue A 512. Queue A 512 has three channel instances running Channel instance 514 is communicating 50 bytes per second, channel instance 516 is communicating 45 bytes per second, and channel instance 518 is communicating 46 bytes per second. Bytes per second may be determined by calculating a difference between total bytes communicated through a channel instance at time 1 and total bytes communicated at time 2 and then dividing by the time difference between time 1 and time 2. As mentioned, the data transferred could be measured in terms of messages or some other measure of data.

Each channel instance communicates messages between queue A 512 and application 1 550. A limited number of queues and channel instances are shown for the sake of simplicity. An actual implementation may include thousands of queues, each having hundreds or thousands of channel instances.

Each machine has a computing profile that describes the machine's hardware and versions of software running on the machine. The computing profile may be a category of machine that is defined by a range of different parameters. Differences may exist between machines that fit into the same computing profile. For example, the computing profile may include computers having a range of processing capacity.

The machine 520 includes queue B 522. Queue B 522 is associated with three active channel instances. Channel instance 524 is communicating 35 bytes per second. Channel instance 526 is communicating 33 bytes per second. Channel instance 528 is communicating 40 bytes per second.

Machine 530 hosts queue C 532. Queue C 532 is associated with two channel instances. Channel instance 534 communicates 50 bytes per second, and channel instance 536 communicates 51 bytes per second.

As mentioned, there are different ways to determine the normal performance of an individual channel instance. FIG. 5 is intended to show a range of performances under normal conditions.

One way of determining a normal condition is to observe the performance of an individual channel instance. For example, if channel instance 514 maintains a throughput of 50 bytes per second over a period of time, then the normal range for channel instance 514 may be set at 50 bytes per second. Channel instance 516 may be given a normal performance of 45 bytes per second if that rate is sustained over time. In this way, each channel instance may have its own normal performance or normal performance range.

In another aspect, the performance of multiple channel instances operating under similar conditions is observed and averaged to form a normal performance parameter, or range. For example, the average message throughput of channel instances 514, 516, and 518 over time may be 47 bytes per second. Thus, the normal performance for channel instances running on machine 510 could be 47 bytes per second. The average transfer rate for channel instances on machine 520 may be closer to 36 or 37 bytes per second. This could be explained by the different computing profile on which the channel instances of machine 520 are running.

In another aspect, the performance of channel instances across multiple machines having the same computing profile may be analyzed to determine a normal performance. For example, the performance of channel instances 514, 516, 518, 534, and 536 could be evaluated to determine the expected or normal performance of a channel instance running on a machine fitting a common computing profile number.

Regardless of the method used, a normal performance is assigned to individual channel instances.

Figure 6:
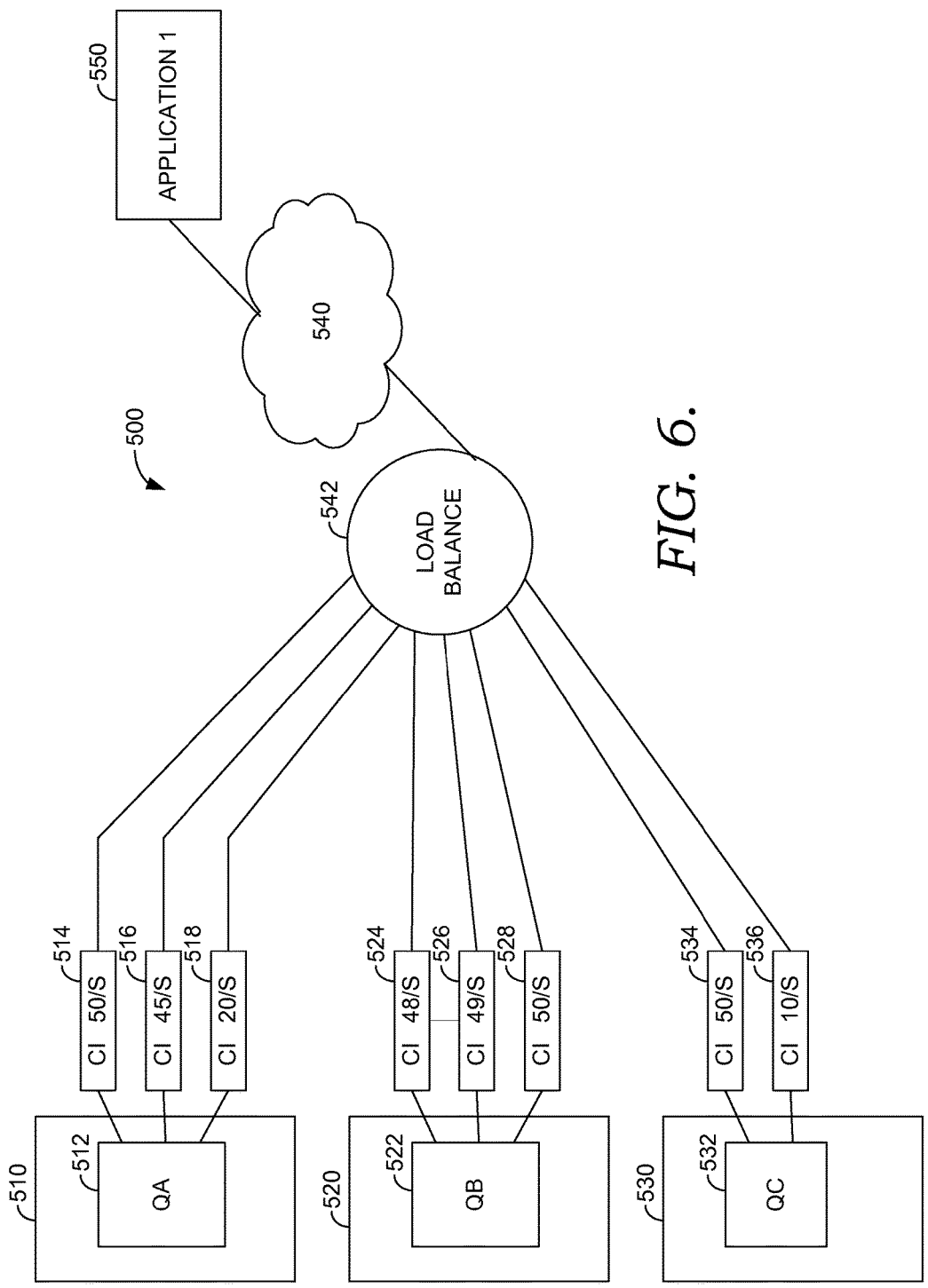
FIG. 6 is a flow diagram in which a method of detecting an abnormal data transfer rate in a channel instance is described according to an aspect of the present invention.

Turning now to FIG. 6, the abnormal performance of a channel instance is shown, in accordance with an aspect of the present invention. The components of FIG. 6 have been described previously with reference to FIG. 5. Only the transmission rate of some channel instances has changed. For the sake of illustration, the normal performance of channel instances running on a machine is determined to be between 47 and 50 bytes per second, which may be a standard deviation from 48.5. As can be seen, the performance of channel instance 516 is 45 bytes per second, which is below the expected range. The performance of channel instance 518 is further below the expected range at 20 bytes per second. The performance of channel instances running on machine 520 are the same as those mentioned previously with reference to FIG. 5 and fall within the normal range. The performance of channel instance 536 is 10 bytes per second, which is well below the normal range.

In one aspect, an upset condition is triggered for channel instance 516, 518, and 536 because these channel instances fall outside of the normal range. Channel instance 536 is two bytes per second above the expected range. Channel instance 516 falls two bytes per second below the expected range. The transmission rate of 20 bytes per second within channel instance 518 falls below the expected performance range by 27 bytes per second. Accordingly, an upset condition is detected for each channel instance. An alarm may be generated for each channel instance and communicated to a designated responder to take remedial action or investigate the cause of the upset condition in channel instances.

In addition to an alarm, queue A 512 and queue C 532 may be rebooted to restart the channel instances. The queues may be rebooted one at a time to avoid decreasing communication capacity below a threshold.

Figure 7:
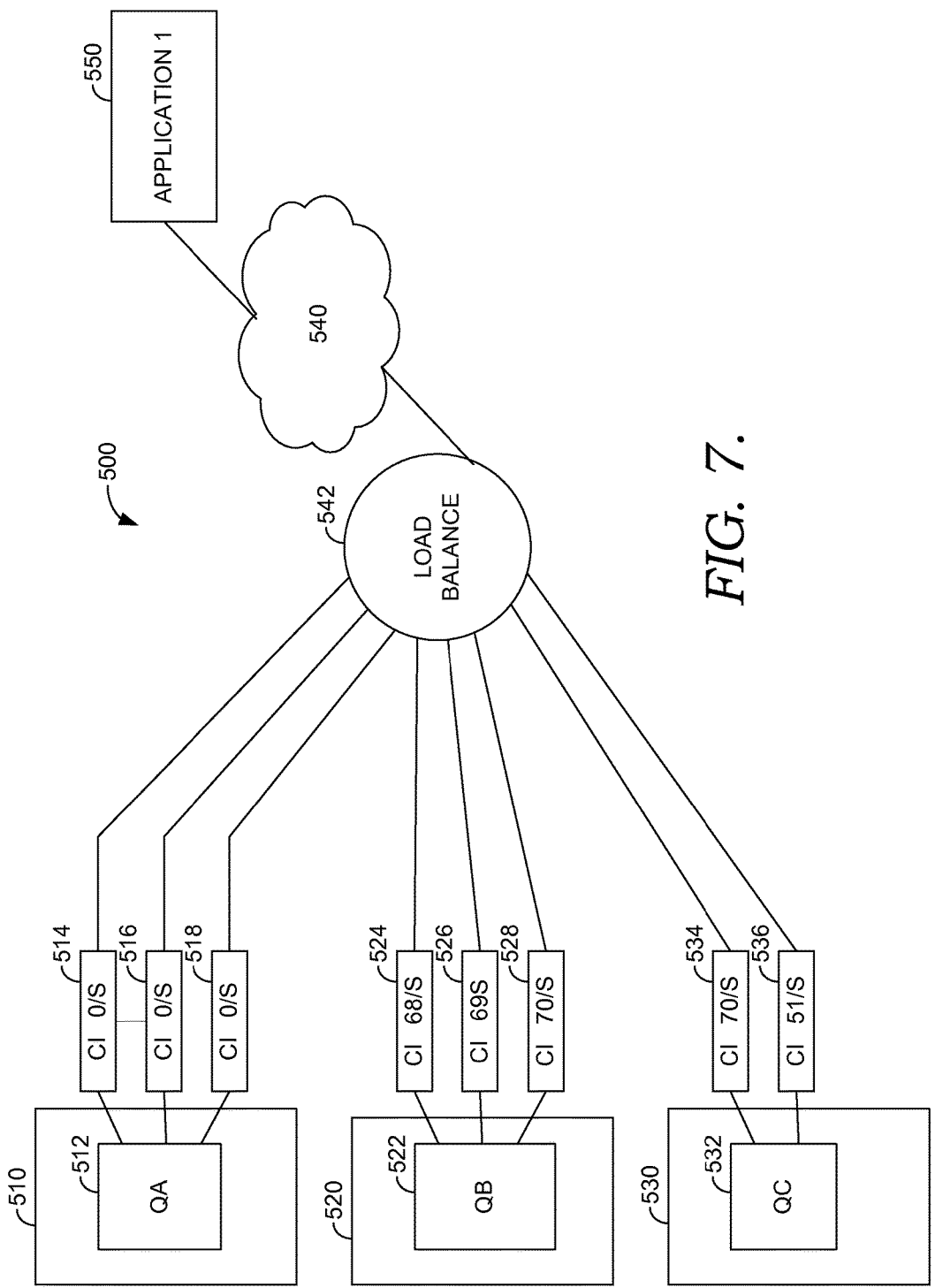
FIG. 7 is a flow diagram in which a method of detecting an abnormal data transfer rate in a channel instance is described according to an aspect of the present invention.

Turning now to FIG. 7, rebooting a queue to fix a problem with channel instances in a messaging-middleware environment 500 is illustrated, in accordance with an aspect of the present invention. The messaging-middleware environment comprises components described previously with reference to FIG. 5. However, the transmission rate of channel instances 514, 516, and 518 have all turned to zero bytes per second as queue A 512 is rebooted. Notice that all channel instances are reset including channel instances working correctly.

The bytes handled by the parallel queues and associated channel instances have increased as shown. In an alternative aspect, additional channel instances could be created to handle the additional traffic to a queue manger while maintaining a channel performance within a normal range. However, the example of FIG. 7 also illustrates that "normal" can change with changing conditions. In one aspect, a normal range is recalculated for each time period. For example, the normal range for the period of time illustrated in FIG. 7 could be Turning now to FIG. 8, a method 800 of detecting an abnormal data transfer rate in a channel instance is shown, in accordance with an aspect of the present invention. The queue may be a part of a messaging-middleware environment. At step 810, a normal data transfer performance for individual instances of a channel is determined. The data may be measured in bytes, messages, or some other unit of measure. Different ways of determining a normal data transfer rate are possible. These methods include taking an average rate based on observations of an individual channel instance, taking an average rate from a group of similar channel instances, and using a theoretical maximum transfer rate achievable by the channel instance. For example, the normal message transfer rate could be 80% of the maximum theoretical transfer rate.

The normal rate may be determined by measuring the message throughput of the a group of channel instances and dividing the throughput by the number of active channel instances during that time period. Thus, if one hundred messages were communicated through the group of channel instances within a second, and five channel instances were running, then the average transfer rate would be 20 bytes per second for an individual channel instance.

In one aspect, the total data transfer through an individual channel instance for a time period may be determined by retrieving a count of total bytes transferred through the channel instance at $T_0$ and $T_1$, where $T_0$ is the beginning of the time period and $T_1$ is the end of the time period. The total bytes at $T_0$ can be subtracted from the total at $T_1$ to calculate the total bytes transferred during the time period. The rate can be calculated by dividing the total bytes transferred during the period by the amount of time that passed between $T_0$ and $T_1$. The normal performance for a channel instance can be calculated by summing the rate for a group of channel instances and dividing by the total instances in the group.

The normal range should take into account the role of the individual channel instance that is being analyzed. Different channel instances may play different roles, especially within a load-balancing regime. If the load-balancing regime attempts to evenly distribute message communication duties between the channel instances, then the performance of each should be similar. On the other hand, if some channel instances have preference within the load-balancing algorithm, then the preferences need to be considered when determining the normal range for each instance. For example, one of the channel instances could be on standby and only used to handle an overflow that the other active channel instances are not able to handle. Then for that one channel instance, the throughput could be much lower than that of the others even though there is no upset condition or abnormality. Thus, the normal range may differ for channel instances associated with a particular queue or with different queues. A different normal performance may be calculated for each similarly situated group of channel instances.

Additionally, the hardware on which the channel instance is running may affect the performance of the channel instance. Thus, different normal performance parameters may be established for different hardware and software profiles for the real or virtual machine on which the channel instance is running. In one aspect, a series of normal performance ranges is established for channel instances in different roles and on different devices.

Once a normal performance is determined for a particular channel instance, the performance of that channel instance is monitored and compared to the normal performance. When the performance of the channel instance falls below or rises above the normal performance, then a response event is initiated. Different response events will be described subsequently.

In one aspect, the normal performance is expressed as a range. In another aspect, the normal performance is expressed as an individual rate. If expressed as a range, any number inside the range may be normal, and a throughput rate for the channel instance outside the range may be considered abnormal. However, an additional threshold may be added to the range to avoid false alarms. For example, the transfer rate may need to fall below the normal range for more than a threshold amount of time before an alarm is sounded or an upset event is initiated. Once the throughput rate falls below the threshold from the normal range, then the upset condition is generated.

The threshold may be statistically derived as a standard deviation away from the normal condition, or two standard deviations or whatever is suitable for the particular channel instance.

At step 820, a present data transfer performance for each of multiple instances of the channel is monitored.

At step 830, an upset condition is determined to exist for a specific channel instance of the multiple instances because the present data transfer performance for the specific channel instance deviates from the normal data transfer performance by at least a threshold amount. As mentioned, the threshold amount may be a standard deviation from the normal performance.

At step 840, an upset response event is generated in response to determining that the upset condition exists. A response event may be an alarm or various troubleshooting steps to resolve the upset condition or determine whether an alarm needs to be sent. In one embodiment, the upset response event is a reboot of the individual channel instance. The individual channel instance can be rebooted by rebooting the queue manager served by the channel instance. In deployments with multiple queue managers in parallel, the status of the other parallel queue managers may be evaluated prior to rebooting the queue manager to confirm adequate data transfer capacity is available to take one of the queue managers offline to reboot. Capacity may be evaluated by comparing the recent throughput, for example, for the last minute, last ten minutes, last hour, or similar, against the rated capacity of the active queue managers. Upon confirming adequate queue manager capacity across the group of queue managers, the queue manager can be rebooted. Upon determining inadequate total queue manager capacity across the group of queue managers, a timer may be started to recheck capacity after a period of time, for example, thirty minutes.

Turning now to FIG. 9, a method 900 of detecting an abnormal data transfer rate in a channel instance is shown, in accordance with an aspect of the present invention. At step 910, data transfer performance information that describes an amount of data that is communicated over a specific instance of a channel during a period of time is received. The performance information may be received by a monitoring device. In one aspect, the performance information is detected by the messaging-middleware software.

At step 920, the amount of data is compared with the normal data transfer performance for the channel instance. At step 930, a response event indicating that a malfunction affecting the channel instance is present is transmitted when the amount of data deviates from the normal data transfer performance by at least a threshold amount.

Turning now to FIG. 10, a method 1000 of detecting an abnormal data transfer rate in a channel instance is shown, in accordance with an aspect of the present invention. At step 1010, a present message transfer performance is monitored for an instance of a channel that communicates messages to a messaging-middleware queue in a queue manager.

At step 1020, an upset condition is determined to exist for the channel instance when the present message transfer performance deviates from a normal data transfer performance by at least a threshold amount. This may be described as outside of a normal message transfer range.

At step 1030, the queue manager associated with the channel instance is automatically rebooted, thereby rebooting the channel instance and all other instances of the channel connected to the queue manager. In one aspect, the rebooting is only initiated after confirming that other parallel queue managers have capacity to handle the additional load created by rebooting the queue manager.

Many different arrangements of the various components depicted, as well as components not shown, are possible without departing from the spirit and scope of the present invention. Aspects of the present invention have been described with the intent to be illustrative rather than restrictive. It will be understood that certain features and subcombinations are of utility and may be employed without reference to other features and subcombinations and are contemplated within the scope of the claims.

The invention claimed is:

1. One or more non-transitory computer storage media having computer-executable instructions embodied thereon for performing a method of detecting an abnormal data transfer rate in a channel instance, the method comprising;
    determining a normal data transfer performance for individual instances of a channel;
    monitoring a present data transfer performance for each of multiple instances of the channel;
    determining that an upset condition exists for a specific channel instance of the multiple instances because the present data transfer performance for the specific channel instance deviates from the normal data transfer performance by at least a threshold amount; and
    in response to said determining the upset condition exists, generating an upset response event for the specific channel instance, wherein the upset response event comprises automatically rebooting the specific channel instance.

2. The media of claim 1, wherein the normal data transfer performance is determined by calculating a total amount of data communicated across the multiple instances of the channel during a time interval and then dividing the total amount by a number of channel instances in the multiple instances of the channel that are running during the time interval.

3. The media of claim 2, wherein the present data transfer performance is determined by calculating an amount of data communicated across the specific channel instance during the time interval.

4. The media of claim 1, wherein the threshold amount is one standard deviation from the normal data transfer performance.

5. The media of claim 1, wherein the rebooting of the specific channel instance comprises generating an instruction to reboot a queue manager associated with the specific channel instance.

6. The media of claim 5, wherein the method further comprises determining that one or more parallel instances of the queue manager are not presently being rebooted prior to generating said instruction.

7. The media of claim 1, wherein the channel instance is associated with a series of parallel queue mangers within a messaging-middleware application and a load-balancing method is in place to distribute messages across multiple channel instances that serve the parallel queue managers in a substantially equal distribution.

8. One or more non-transitory computer storage media having computer-executable instructions embodied thereon for performing a method of detecting an abnormal data transfer rate in a channel instance, the method comprising:

receiving data transfer performance information describing an amount of data that is communicated over a specific instance of a channel during a period of time;

comparing the amount of data with a normal data transfer performance for the specific instance of the channel, wherein the normal data transfer performance is determined by calculating a total amount of data communicated across multiple instances of the channel during a time interval and then dividing the total amount by a number of channel instances in the multiple instances of the channel that are running during the time interval; and when the amount of data deviates from the normal data transfer performance, by at least a threshold amount, generating an upset response event.

9. The media of claim 8, wherein the multiple instances of the channel have the same process identification and thread identification.

10. The media of claim 8, wherein the threshold amount is one standard deviation from the normal data transfer performance.

11. The media of claim 8, wherein the amount of data that is communicated over the specific instance of the channel exceeds the normal data transfer performance by at least the threshold amount.

12. The media of claim 8, wherein the specific instance of the channel communicates data to a queue manager, wherein the upset response event comprises determining that one or more parallel instances of the queue manager presently have capacity to handle messages being processed by the queue manager to be rebooted and automatically generating an instruction to reboot the specific instance of the channel.

13. A method of detecting an abnormal data transfer rate in a channel instance, the method comprising;

monitoring a present message transfer performance for an instance of a channel that communicates messages to a messaging-middleware queue in a queue manager;

determining that an upset condition exists for the instance of the channel when the present message transfer performance deviates from a normal data transfer performance by at least a threshold amount; and in response to said determining the upset condition exists, automatically rebooting the queue manager, thereby rebooting the instance of the channel and all other instances of the channel connected to the queue manager.

14. The method of claim 13, wherein the method further comprises determining the normal data transfer performance for a hierarchical level of channel instances.

15. The method of claim 14, wherein the hierarchical level is all instances of the channel.

16. The method of claim 14, wherein the hierarchical level is all instances of the channel having the same process identification.

17. The method of claim 14, wherein the hierarchical level is all instances of the channel having the same process identification and same thread identification.

18. The method of claim 14, wherein the normal data transfer performance is determined by calculating a total amount of data communicated across the hierarchical level of channel instances of the channel during a time interval and then dividing the total amount by a number of channel instances in the hierarchical level of channel instances that are running during the time interval.

* * * * *